April 6, 1971 M. S. TARNOPOL 3,573,948

METHODS OF MAKING AN IMAGE PLANE PLATE

Filed March 12, 1968 2 Sheets-Sheet 1

INVENTOR
MILTON S. TARNOPOL

BY [signature]
ATTORNEYS

April 6, 1971 M. S. TARNOPOL 3,573,948

METHODS OF MAKING AN IMAGE PLANE PLATE

Filed March 12, 1968 2 Sheets-Sheet 2

INVENTOR
MILTON S. TARNOPOL

BY [signature]
ATTORNEYS 3,573,948

METHODS OF MAKING AN IMAGE PLANE PLATE

Milton S. Tarnopol, Brackenridge, Pa., assignor to PPG Industries, Inc., Pittsburgh, Pa.

Continuation-in-part of application Ser. No. 701,425, Jan. 29, 1968. This application Mar. 12, 1968, Ser. No. 712,533

Int. Cl. G03c *5/00;* H05k *3/00*

U.S. Cl. 117—5.5 3 Claims

ABSTRACT OF THE DISCLOSURE

The invention comprises improvements in making image-plane plates of glass stained on one surface thereof, in accordance with which improved resolution and/or the advantages associated with having a planar plate surface are obtained by using the screening action of tin oxide, which prevents metal staining of the glass.

CROSS-REFERENCE TO RELATED APPLICATION

This application is a continuation in part of co-pending application Ser. No. 701,425, filed Jan. 29, 1968, now abandoned.

BACKGROUND OF THE INVENTION

An image plane plate is a glass plate used as a template in the process of printing "circuits" on a suitable substrate material. One prior art method of making image plane plates is to etch the circuit in the glass plate and fill in the etched portion with an ultraviolet opaque material, usually with a "metallic" filling. The etched and filled circuit pattern is then applied directly to a photosensitive coated surface of a copper clad circuit board. The coated board is then exposed to ultraviolet light passing through the image plane plate and the pattern of the circuit is produced in the photosensitive coating covering the copper plate. The metallic filled plane plate is expensive and there is a rapid deterioration in the quality and acuteness of the circuit lines after repeated use. Repeated use of the plate, in contact with the printed circuit board, makes it necessary to rework the grooves of the pattern after about seventy-five applications. An improved image plane plate and a method of making the plate is disclosed in a co-pending application Ser. No. 671,830 filed Sept. 29, 1967, by Milton S. Tarnopol, Robert S. Twells, and Ronald R. Rigby. The improved image plane plate of the invention disclosed in that application includes a glass sheet of a desired shape and size, portions of the sheet, including a surface of the glass sheet, being treated to provide a thin, ultraviolet opaque zone in the sheet. Any desired circuit pattern to be printed is then etched into the surface of the glass plate so that the ultraviolet opaque zone is removed in the form of the desired pattern. The process disclosed therein produces a glass plate having ultraviolet transmitting areas in the pattern of the circuit. The image plane plate is then used as a mask or template which is laid over a copper clad circuit board having a photosensitive coating. The image plane plate is positioned between an ultraviolet light source and the copper clad board and is contacted usually with the coated circuit board. The ultraviolet light passes through the etched portions of the image plane plate and reacts with the underlying photosensitive material. The photosensitive material is polymerized by the action of the ultraviolet light; the unpolymerized coating material is stripped away, leaving a pattern of hardened solvent-inert photoresist which is in the pattern of the desired circuit. The copper lying beneath areas exposed to ultraviolet light is protected by the hardened coating, and serves to protect the copper during the subsequent etching process. The copper plate is then dipped into an etchant bath and the unprotected copper surface is removed. After the copper-clad board is removed from the etchant bath, the inert film is then dissolved from the copper surface, leaving a copper conductor in the pattern inscribed in the image plane plate. The ultraviolet opaque zone induced in a portion of one side of the glass plate, including the surface of that portion, was induced by the application of a dispersion of silver chromate and titania in an appropriate vehicle. This coating may be applied to the plate in many ways, such as by spraying, dipping, etc. In the preferred embodiment the mixture was applied by silk screening. The glass is then fired, air cooled and the spent coating washed away from the glass. The plate thus treated with silver chromate and titania is colored with a transparent deep red and uniform stain having extremely low or practically zero transmission of light in the ultraviolet range. Other embodiments of preparing the plate are disclosed therein. The plane plate produced by that technique is stained to an approximate depth of one mil; however, the staining can be extended by additional treatment to a greater or lesser depth, depending upon the required opacity to ultraviolet light. In that process a protective coating is applied to the stained plate and a pattern is scribed in the coating; the unprotected glass is etched away, including portions of the opaque zone, while the protected portions of the surface remain unetched. Whenever this etching operation is performed, the etching proceeds sideways into the substrate at about the same rate as it penetrates the glass substrate. Therefore, if one etches a groove, it will usually have a minimum width equal to twice the depth plus the starting width. This is defined as "etch factor." This phenomenon tends to limit the close spacing of lines that can be etched or, in fact, determines the number of lines per inch. This invention provides methods of producing image plane plates either eliminating or greatly reducing the etch factor problem.

SUMMARY OF THE INVENTION

This invention provides a method of producing an image plane plate which has a "greater line resolution" in terms of lines per inch as well as fineness of the lines. In prior art proposals the "ion exchanged" ultraviolet light opaque layer is usually rather thick, compared with the total thickness of the glass plate. To remove portions of the ultraviolet opaque barrier it was necessary to etch the glass to the depth of the layer, and as described above, the deeper the etch the wider the top of the etch trough becomes. My invention provides methods of using a shallow etching which reduces the effect of etch factor, hence, a greater number of lines per inch may be inscribed in the plane plate. A greater number of lines per linear inch may be inscribed in the base plate. The process of my invention permits the development of an image plane plate with a relatively shallow etch; the resultant reduction in the width of the etch due to the "etch factor" permits the scribing of a greater number of lines per inch in the surface of the plate.

Another process produces image plane plates in which the ultraviolet light opaque areas are in the same plane of the glass as the light transmitting areas, the surface being smooth and unetched.

DESCRIPTION OF DRAWINGS

A full understanding of the practice of these processes can be had by referring to the accompanying drawings wherein.

DESCRIPTION OF PREFERRED EMBODIMENTS

Figure 1:
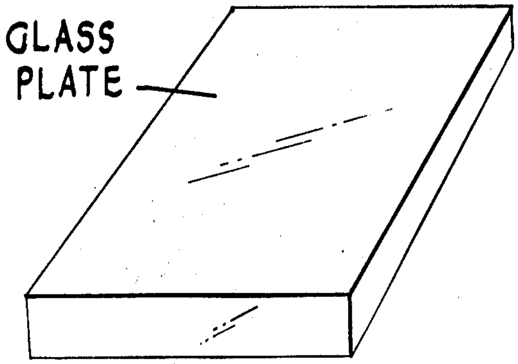
FIG. 1 shows a glass plane plate.
Figure 2:
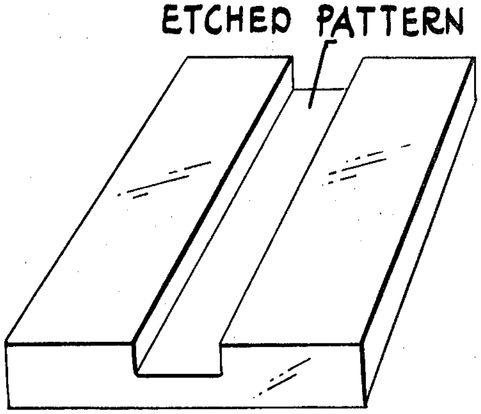
FIG. 2 shows a line of a circuit etched into the glass.
Figure 3:
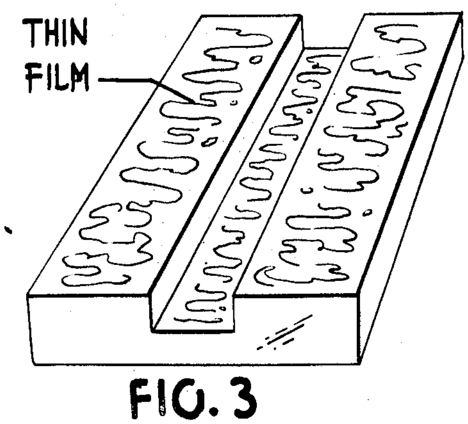
FIG. 3 shows the etched plate with a protective coating.

The image plane plate of this invention may be made in the following manner. A glass plate is cut to a suitable size and shape. The circuit pattern is etched into the glass by standard etching techniques known in the art, including acid etching of a scribed or photosensitive imprinted pattern as shown in FIGS. 1 and 2.

A coating is applied to the glass plate. The coating may be applied by evaporation, hot spraying, vapor coating, or other techniques known in the art.

Figure 4:
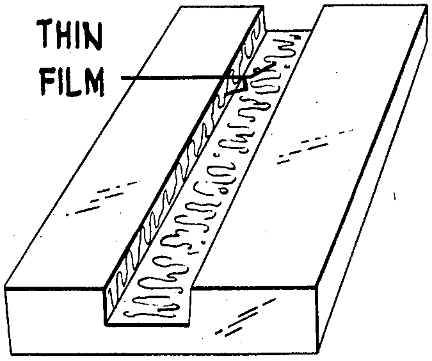
FIG. 4 illustrates the protective coating removed from all but the etched portions of the plate.
Figure 5:
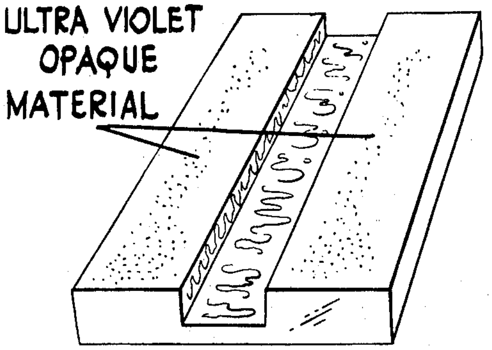
FIG. 5 shows the plate with an ultraviolet opaque zone.

A preferred coating is stannic oxide. The stannic oxide or other coating is removed from the unetched portions as shown in FIG. 4. This may be done by the reduction of the stannic oxide coating by an acid and a metal, e.g., zinc and hydrochloric acid. By using a flat piece of metal and contacting only the unetched areas of the glass, the protective coating will be removed only from the unetched areas, and will remain in the etched areas.

The protected glass is then stained to produce an ultraviolet light opaque layer. One method of inducing the ultraviolet light opaque zone is by the use of a mixture applied by silk screening and a dispersion of silver chromate and titania in an appropriate vehicle. The thus treated glass is fired in an oven at about 1150° F. for about seven minutes. The fired glass is then air cooled and the "spent coating" is washed away from the glass using a sponge and water. The glass treated with this silver chromate and titania is colored with a transparent deep red and uniform "stain" having approximately eight to ten percent transmission in the visible light range but extremely low or practically zero transmission in the ultraviolet light range. This process induces in the glass a layer or zone of ion exchanged material extending from the surface into the body of the glass plate. The "ion exchanged zone" exhibits reduced transmission of ultraviolet light as described above.

The pattern can be etched into the glass before staining using any number of known techniques, such as coating the glass with a photosensitive negative or photosensitive coating or manually scribing the circuit into the photoresist coating of the glass. The scribe coated plane plate is immerged in an etching solution. The unprotected glass is etched away while the protective surface remains unetched. The etched plate is then removed from the bath and washed and dried. The glass is then coated with a thin film of stannic oxide by evaporation, hot spraying, vapor coating or other techniques known in the art. The stannic oxide is removed by reduction, using a flat piece of metal contacting the unetched surfaces. The oxide will remain in the grooved areas and is removed only from the areas which contact the metal plate. The glass is then stained as dsecribed above and disclosed in U.S. patent application Ser. No. 671,830, filed Sept. 29, 1967 in the names of Tarnopol, Twells, and Rigby.

Figure 6:
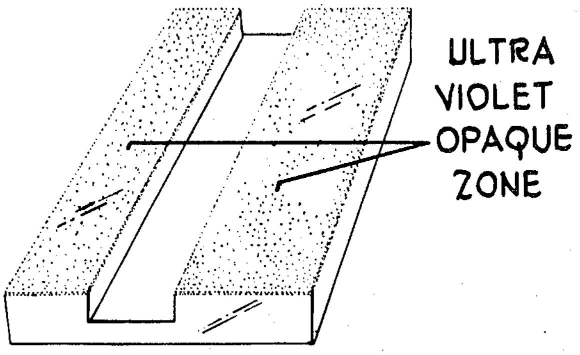
FIG. 6 shows the completed plate with the unetched portions having an opaque zone.

The advantages of this improved method are readily apparent. The need to etch through the ultraviolet light opaque zones of the glass plate is eliminated. The scribed or etched pattern need only be induced into the surface to a very nominal depth. This eliminates the problem resulting from "etch factor." The improved method permits the etching of a greater number of lines per inch in the plate and produces a higher resolution of lines because the top of the etched portions are almost the same in dimension as the bottom of the trough of the etched portion. The side of the etched portions are stained only to the same depth as the rest of the plate is penetrated by the ion exchanging medium as shown in FIG. 6. This produces a scribed area in a pattern which greatly reduces the amount of "scattering" which occurs when the ultraviolet light source passes through the image plane plate to the coated circuit board positioned below.

Figure 7:
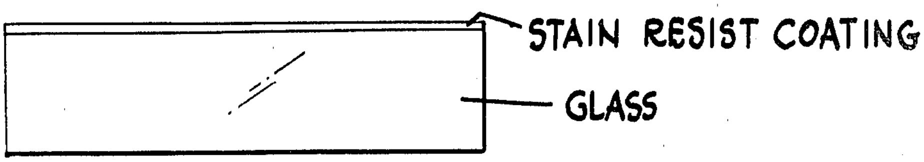
FIG. 7 shows a glass plane plate coated with a stain resist coating.

The following method produces image plane plates having ultraviolet light opaque areas in the same plane as the light transmission areas. The manufacture of image plane plates by this method eliminates the necessity of impressing or inducing the pattern into the glass surface by such means as etching. The image plane plate made by this method produces a plate having great dimensional stability and no etched circuit patterns, which is most desirable in the manufacture of printed circuits and other electronic parts, such, as television color tube shadow masks. To make an image plane plate using this process, a suitable glass piece, i.e., plane plate, is selected, as shown in FIG. 7. A coating of "stain" resistant material is applied by any of several well-known techniques, such as pyrolytic spraying, evaporation, sputtering, dipping, or other, applying methods. Any of several means may be employed to either physically inscribe or photographically implant a desired pattern in a photosensitie protective layer laid over the stain resistance protective coating. One very effective stain resistant coating is tin oxide, applied as shown in FIG. 7.

Figure 8:
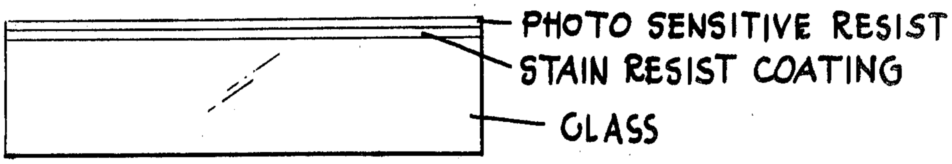
FIG. 8 shows the combined layers of stain resist and overlying photosensitive coating.
Figure 9:
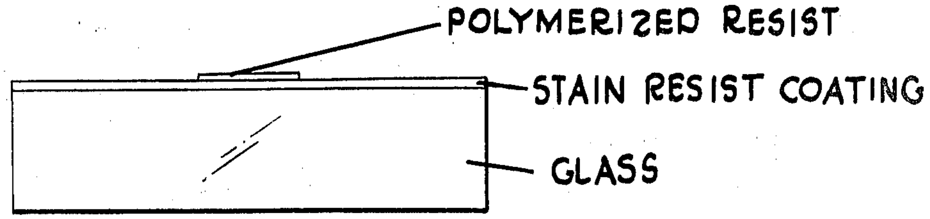
FIG. 9 shows a developed polymerized coating.

Then a suitable photographically sensitive resist coating is applied over the stain resist or etched portions of the stain resist coated plate, as shown in FIG. 8. The coated glass surface is exposed to a suitable pattern, such as a master photographic negative or a master image plane plate. The pattern is reproduced in the photosensitive resist layer and the layer is photographically developed. The development process polymerizes light struck portions of the coating, as described hereinabove. The unpolymerized coating easily washes away or is otherwise removed, as described above. This step is shown in FIG. 9. A layer of hardened polymerized resist remains on the stain resist coating in the form of the pattern as originally implanted in the resist, and the stain resist also is in pattern form. The remaining coating is removed.

Figure 10:
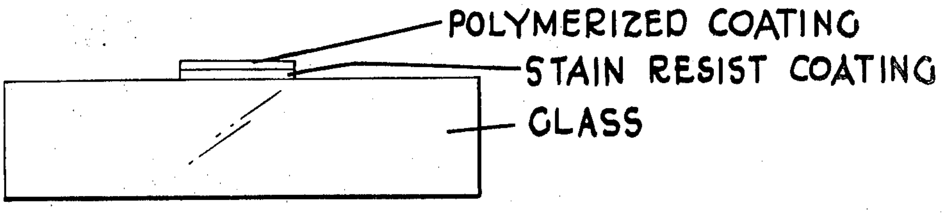
FIG. 10 shows the unprotected areas of stain resist removed to expose the substrate.

The plate is then exposed to a reducing atmosphere, or a reducing agent is applied to the surface to remove areas of exposed stain resist coating, as shown in FIG. 10.

Figure 11:
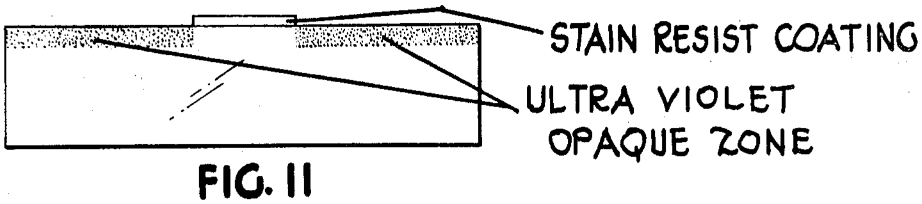
FIGS. 11 and 12 show an image plane plate, both opaque and transparent areas in the same plane of the glass.
Figure 12:
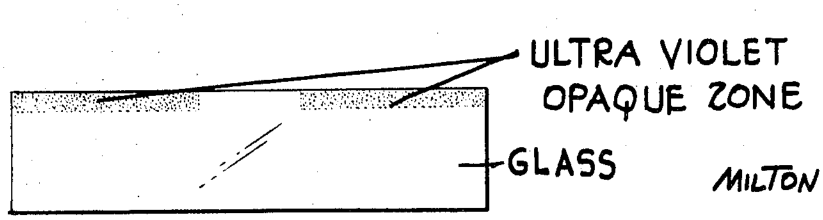

The glass plate is then exposed to a "staining" process. The surface of the glass plate is then stained, as described, using silver chromate or other ultraviolet light opaque forming material. The stain resist coating is removed in the prior step, and now the surface of the glass, unprotected by the resist coating, absorbs the stain in what is believed to be an ion exchanging process. FIG. 11 shows this staining process. The stain resist coating is then removed, as shown in FIG. 12, and an image plane plate having ultraviolet opaque zones is produced, the unstained areas of the plate being in the form of the desired pattern and transmitting light. As described above, this plate may then be used as a master negative in the further production of printed circuits and other electronic parts.

One staining material which is very effective is a silver chromate solution applied to the surface of the glass and heated to 1000° F. for a suitable period. It has been discovered that tin oxide is very impervious to the penetration by the silver chromate stain.

The process described herein may be altered if different types of photoresist materials are used, i.e., the desired pattern may now be an opaque area, and the light transmitted through the clear areas, depending upon the substrate used to cover the copper circuit boards. It is contemplated herein that other combinations of protective coating and ion exchanging staining materials may be used in this process of producing image plane plates.

What is claimed is:

1. In the making of a printed circuit by causing ultraviolet light to pass through a master having selected areas that are substantially opaque to said light and then strike a stratum of photoresist material, said master being of glass capable of exchanging ions with silver and said selected areas being made opaque to ultraviolet light as the result of the migration of silver ions into said glass in said area as the result of treatment with a silver containing staining agent, the improvement comprising applying to said glass in the vicinity of the portions thereof that are to remain substantially transparent to ultraviolet light a stratum of tin oxide.

2. The improvement of claim 1, characterized in that said glass is etched to produce depressions, the said tin oxide is placed in the said depressions, and the said glass is then subjected to the action of said silver staining agent.

3. The improvement of claim 1, characterized in that said glass is in the form of a plate having a planar face that the said tin oxide is applied to said face in the regions thereof that are intended to remain substantially transparent to ultraviolet light, and that said plate is thereafter subjected to the action of a silver staining agent.

References Cited

UNITED STATES PATENTS

| | | | |
|---|---|---|---|
| 3,424,567 | 1/1969 | Smith | 65—30 |
| 3,420,698 | 1/1969 | Smith | 65—30X |
| 3,370,948 | 2/1968 | Rosenbauer | 156—15X |
| 3,210,214 | 10/1965 | Smith | 117—5.5X |
| 2,999,339 | 9/1961 | Hensler | 117—5.5X |
| 2,995,461 | 8/1961 | Boicey et al. | 117—5.5 |
| 2,964,427 | 12/1960 | Rheinberger et al. | 117—33.3 |
| 2,606,566 | 8/1952 | Tarnopol | 117—211X |

ALFRED L. LEAVITT, Primary Examiner

A. GRIMALDI, Assistant Examiner

U.S. Cl. X.R.

65—30, 60; 96—36.2; 117—33.3, 38, 159, 211, 212; 156—15, 24; 161—6